(12) United States Patent
Halbweiss

(10) Patent No.: US 7,780,217 B2
(45) Date of Patent: Aug. 24, 2010

(54) MOVABLE ROOF FOR AN AUTOMOBILE

(75) Inventor: Thomas Halbweiss, Remseck (DE)

(73) Assignee: Magna Car Top Systems GmbH, Bietigheim-Bissingen (DE)

( * ) Notice: Subject to any disclaimer, the term of this patent is extended or adjusted under 35 U.S.C. 154(b) by 202 days.

(21) Appl. No.: 12/171,715

(22) Filed: Jul. 11, 2008

(65) Prior Publication Data

US 2009/0015033 A1    Jan. 15, 2009

(30) Foreign Application Priority Data

Jul. 13, 2007   (DE) .................. 10 2007 032 674

(51) Int. Cl.
*B60J 7/14* (2006.01)
(52) U.S. Cl. ............. 296/107.09; 296/116; 296/107.15; 296/107.16
(58) Field of Classification Search .............. 296/108, 296/116, 117, 107.07, 107.09, 107.15, 107.17, 296/107.16
See application file for complete search history.

(56) References Cited

U.S. PATENT DOCUMENTS

| | | | | |
|---|---|---|---|---|
| 5,207,474 | A * | 5/1993 | Licher et al. | 296/107.15 |
| 5,829,821 | A | 11/1998 | Aydt et al. | |
| 6,139,087 | A * | 10/2000 | Wolfmaier et al. | 296/107.16 |
| 6,270,143 | B1 | 8/2001 | Heselhaus et al. | |
| 6,425,622 | B2 | 7/2002 | Eberle | |
| 6,513,857 | B2 | 2/2003 | Pfertner et al. | |
| 6,666,494 | B2 * | 12/2003 | Antreich | 296/107.01 |
| 6,843,522 | B2 * | 1/2005 | Lange | 296/107.09 |
| 7,118,161 | B2 * | 10/2006 | Neubrand | 296/107.15 |
| 7,178,852 | B2 * | 2/2007 | Obendiek et al. | 296/107.17 |
| 7,500,709 | B2 * | 3/2009 | Heselhaus | 296/107.07 |
| 2001/0019213 | A1 | 9/2001 | Eberle | |
| 2002/0024230 | A1 | 2/2002 | Pfertner et al. | |
| 2004/0061353 | A1 * | 4/2004 | Habacker | 296/107.08 |
| 2007/0035154 | A1 * | 2/2007 | Eisenreich et al. | 296/107.01 |
| 2007/0284909 | A1 * | 12/2007 | Dilluvio | 296/107.01 |
| 2008/0061593 | A1 * | 3/2008 | Beierl et al. | 296/118 |
| 2008/0277962 | A1 * | 11/2008 | Beierl | 296/107.07 |

FOREIGN PATENT DOCUMENTS

| | | |
|---|---|---|
| DE | 44 41 666 C1 | 12/1995 |
| DE | 199 34 673 C1 | 1/2001 |
| DE | 100 06 296 C1 | 5/2001 |
| DE | 100 41 487 A1 | 3/2002 |
| DE | 102 05 935 | 8/2003 |
| DE | 103 44 679 B4 | 6/2005 |
| EP | 1 101 642 | 5/2001 |
| EP | 1 555 152 | 7/2005 |
| JP | 2-306822 | 12/1990 |

* cited by examiner

*Primary Examiner*—Jason S Morrow
(74) *Attorney, Agent, or Firm*—Brooks Kushman P.C.

(57) ABSTRACT

A roof assembly for a vehicle includes a roof, a guide bar system, and a guide bar mechanism. The roof has front, middle, and rear roof elements movable between a closed position covering a passenger compartment of the vehicle and an opened position stacked in a storage compartment of the vehicle. The guide bar system has front and rear guide bars. The guide bars are connected at one end to the front roof element and are rotatable about respective articulated joints at another end to move the roof elements between the closed and opened positions. The guide bar mechanism has a first control rod rotatably connected between the front guide bar and the middle roof element and a second control rod rotatably connected between the rear guide bar and the middle roof element to assure a desired movement of the middle roof element between the closed and opened positions.

19 Claims, 3 Drawing Sheets

MOVABLE ROOF FOR AN AUTOMOBILE

CROSS-REFERENCE TO RELATED APPLICATIONS

This application claims foreign priority benefits under 35 U.S.C. §119(a)-(d) to DE 10 2007 032 674.4, filed Jul. 13, 2007, which is hereby incorporated by reference in its entirety.

BACKGROUND OF THE INVENTION

1. Field of the Invention

The present invention relates to a roof assembly having a roof which includes a plurality of roof elements which are movable between a closed position in which the roof elements cover a passenger cabin of a vehicle and an opened position in which the roof elements are stored in a storage compartment of the vehicle lying above one another.

2. Background Art

JP 2306822 describes a roof having front and rear roof elements movable between closed and opened roof positions. The roof elements are rigid and are assembled so that their respective sides are turned toward one another with a small distance between them in the closed position, and impart a well-defined external roof contour to a flexible soft top material by acting like a type of large-area convertible top bow. The rear roof element is mounted on the vehicle body by a main guide bar system comprising front and rear main guide bars that form a first four-bar linkage. The front roof element is articulated to the rear roof element through a second four-bar linkage having front and rear guide rods. A coupling rod is between the rear guide rod of the second four-bar linkage and the rear main guide bar of the first four-bar linkage.

DE 100 06 296 C1 (corresponding to U.S. Pat. No. 6,425,622) describes a convertible vehicle roof having a front roof element, a middle (main) roof element, and a rear roof element movably connected with one another to move between the closed and opened positions. A main bearing assembly pivotally connects the middle roof element to the vehicle body with the aid of a four-bar linkage. The front roof element is also moved by a four-bar linkage. A rearmost roof element, having a horizontal roof section and an upright roof section, is connected to the rear roof element. When the roof is in the opened position, the rearmost roof element is located above the front roof element, the middle roof element is located below the front roof element, and the rear roof element is located below the middle roof element.

DE 44 41 666 C1 (corresponding to U.S. Pat. No. 5,829,821) describes a vehicle folding top movable between the closed and opened positions. The folding top includes a canopy framework and a cover having a rigid canopy section. The canopy section borders on a cross section of the windshield frame and is attached respectively to a front guide bar and a rear guide bar on its longitudinal sides, which are connected directly to the vehicle body or an intermediate guide bar. DE 196 22 953 C1 (corresponding to U.S. Pat. No. 5,971,470) describes a similar design, namely a canopy section that stretches a soft top into a roof shaped position.

DE 100 41 487 (corresponding to U.S. Pat. No. 6,513,857) describes a vehicle folding top having a foldaway rear window that is inserted into a frame. The rear window is flexibly joined to the vehicle body in a rear-facing region at about belt line height. Articulated levers are mounted on frames of the rear window and on tensioned convertible top bow to move the rear window.

SUMMARY OF THE INVENTION

An object of the present invention is a roof for automobiles that can be moved between a closed position and an open position, which contains a plurality of roof elements, and is characterized by spatially advantageous relationships, especially in the opened position.

In carrying out the above object and other objects, the present invention provides a roof assembly for a vehicle. The roof assembly includes a roof, a main guide bar system, and a guide bar mechanism. The roof has a front roof element, a middle roof element, and a rear roof element which are movable between a closed position in which the roof elements extend longitudinally side-by-side and an opened position in which the roof elements lie above one another. The roof elements create a shaped section of an exterior shell of a vehicle body when in the closed position. The main guide bar system has a front main guide bar and a rear main guide bar. One end of the front main guide bar and one end of the rear main guide bar are connected to the front roof element and the other ends of the front main guide bar and the rear main guide bar are rotatable about respective articulated joints to move the roof elements between the closed and opened positions. The guide bar mechanism has a first control rod rotatably connected between the front main guide bar and the middle roof element and a second control rod rotatably connected between the rear main guide bar and the middle roof element to assure a desired movement of the middle roof element when the roof elements are moved between the closed and opened positions.

Also, in carrying out the above object and other objects, the present invention provides a vehicle having the roof assembly.

A roof assembly in accordance with embodiments of the present invention includes a roof, a main guide bar system, and a guide bar mechanism. The roof includes front, middle, and rear roof parts which are movable between closed and opened positions. The main guide bar system includes a front main guide bar and a rear main guide bar. The guide bar mechanism includes first, second, and third control rods. The main guide bar system and the guide bar mechanism cooperate with the middle roof element to assure an exemplary motion of the middle roof element between the closed and opened positions. The linkage of the middle roof element to the main guide bar system sets new standards in the kinematics of convertible top technology because an exemplary stacking of the middle roof element can be achieved over the rear roof element. The latter contributes to a spatially advantageous storage position for the middle roof element. However, passing of the middle roof element from the opened position into the closed position is advantageous because a desired tension is thereby assured for a cloth top lying above the roof elements. The preceding is supported due to the type and number of control rods of the guide bar mechanism and their linkage on the middle roof element and the front and rear main guide bars of the main guide bar system.

The above features, and other features and advantages of the present invention as readily apparent from the following detailed descriptions thereof when taken in connection with the accompanying drawings.

DETAILED DESCRIPTION OF THE PREFERRED EMBODIMENT(S)

Figure 1:
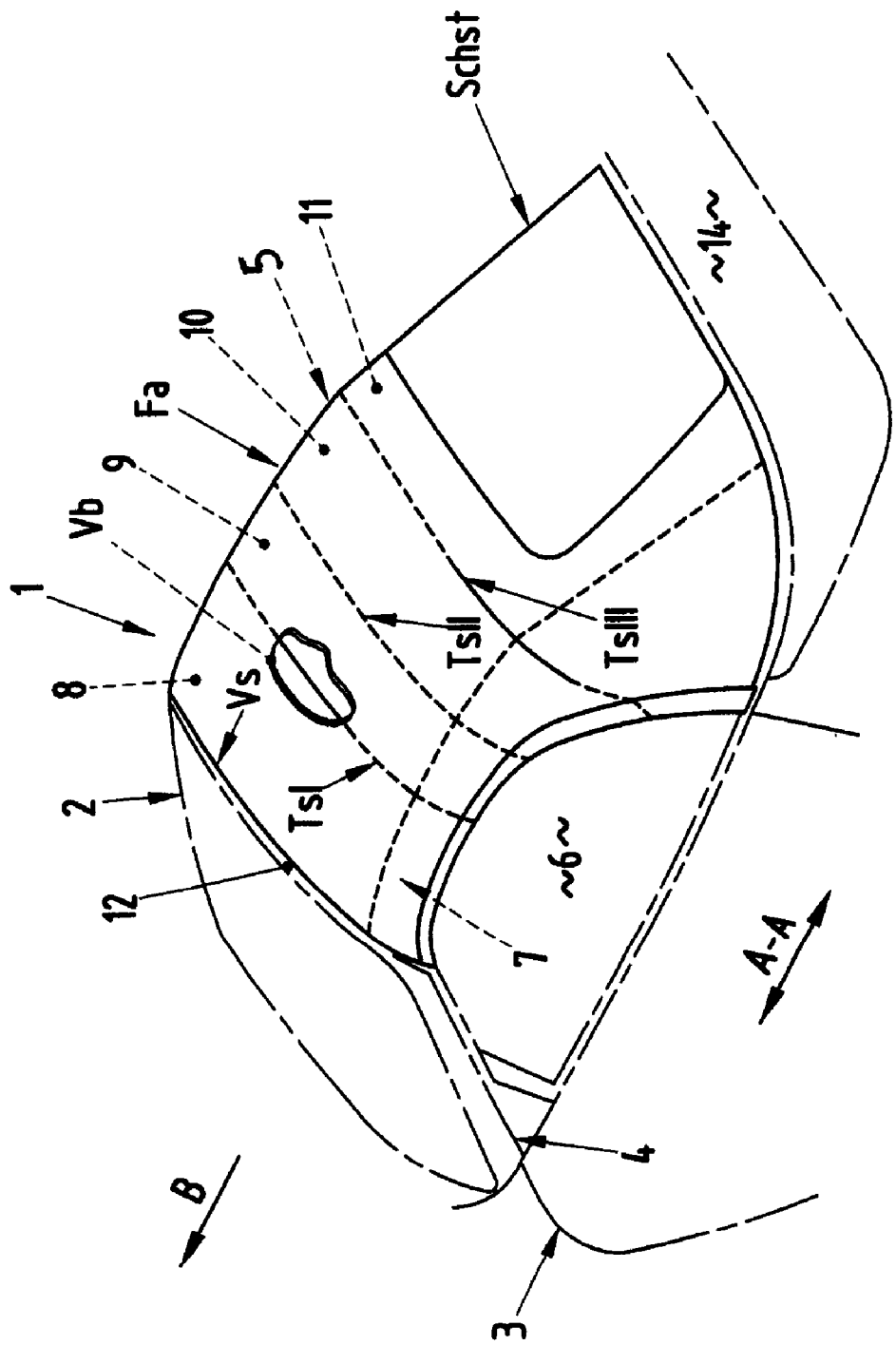
FIG. 1 illustrates a roof assembly having a roof in accordance with an embodiment of the present invention.

Referring now to FIG. 1, a roof assembly in accordance with an embodiment of the present invention is shown. The roof assembly includes a roof 5. Roof 5 has a soft-top quality and is installed on an automobile such as vehicle 1 having a vehicle body 2 with side doors 3 and a windshield frame 4. Roof 5 includes a frontal roof element 8, a front roof element 9, a middle roof element 10, and a rear roof element 11. Roof elements 8, 9, 10, 11 are movable between a closed position of roof 5 (Schst shown in FIG. 1) in which the roof elements cover passenger cabin 6 of vehicle body 2 and an opened position of roof 5 (Ost shown in FIG. 5) in which the roof elements are stacked upon one another and stored in a storage space 14 in a rear region of vehicle body 2.

In the closed roof position, roof elements 8, 9, 10, 11 lie next to one another along the longitudinal vehicle direction A-A. Frontal roof element 8 is the most forward roof element and rear roof element 11 is the most rearward roof element. Front roof element 8 lies between frontal and middle roof elements 8, 10. Front roof element 8 is placed with its front side Vs on an upper transverse frame 12 of windshield frame 4.

Roof elements 8, 9, 10, 11 create a shaped section Fa of an exterior shell contour 7 of vehicle body 2. Shaped section Fa imparts a shape suitable for exterior shell contour 7, at least in sections, to a flexible soft top Vb. Roof elements 8, 9, 10, 11 are assembled at respective section points TsI, TsII, and TsIII. Section points TsI, TsII, and TsIII are oriented transverse to longitudinal vehicle direction A-A.

Figure 2:
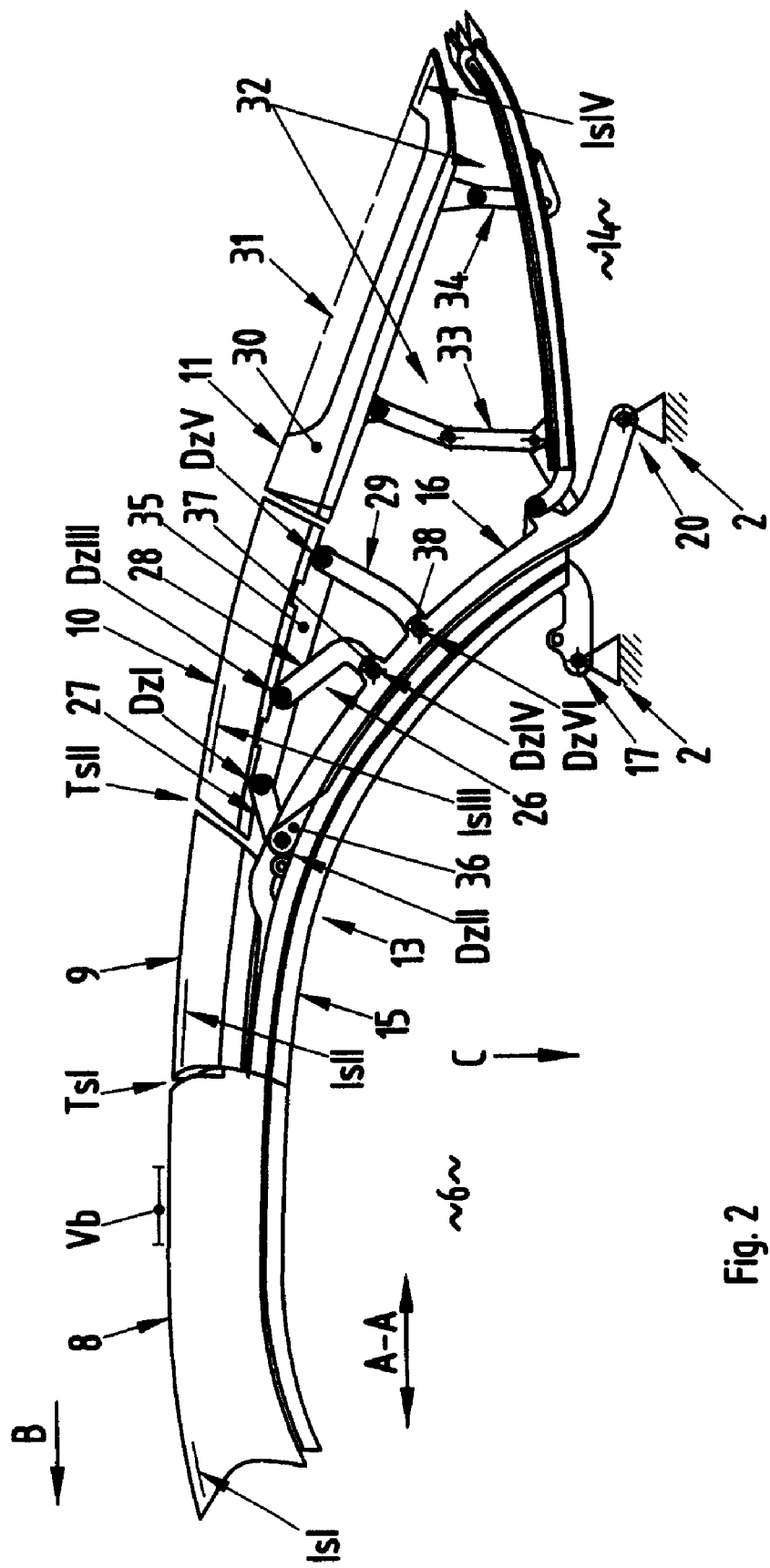
FIG. 2 illustrates a side view of the roof assembly with the roof in a closed position.
Figure 3:
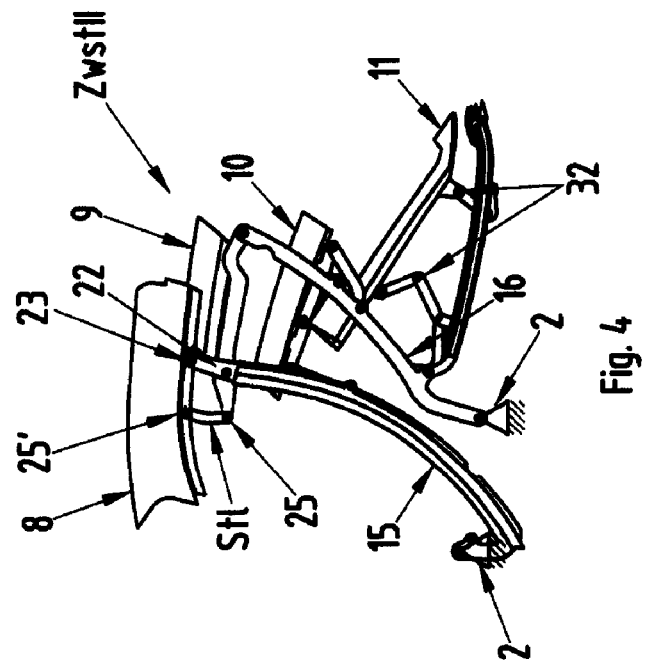
FIG. 3 illustrates a side view of the roof assembly with the roof in a first intermediate position towards the closed position.
Figure 4:
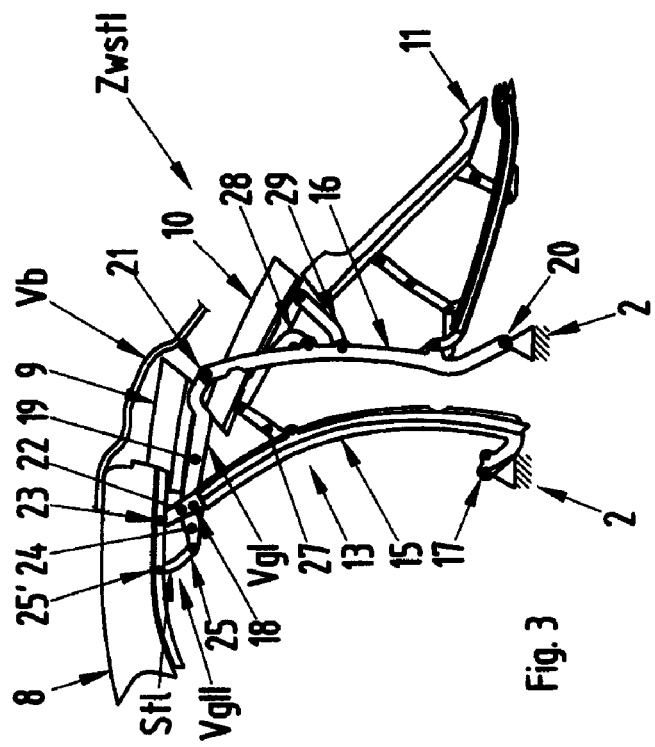
FIG. 4 illustrates a side view of the roof assembly with the roof in a second intermediate position towards an opened position.
Figure 5:
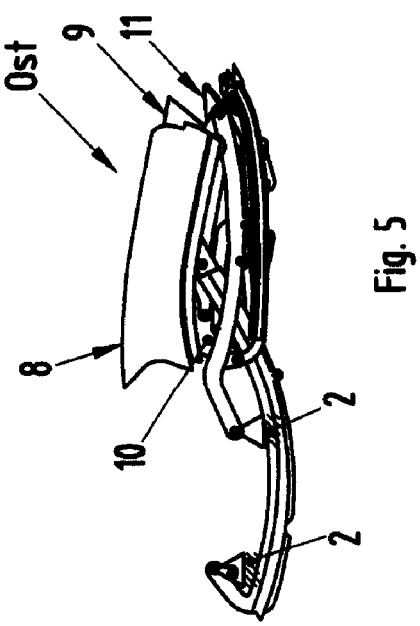
FIG. 5 illustrates a side view of the roof assembly with the roof in the opened position.

Referring now to FIGS. 2, 3, 4, and 5, with continual reference to FIG. 1, side views of the roof assembly are shown. In particular, FIG. 2 illustrates a side view of the roof assembly with roof 5 in the closed position Schst. FIG. 3 illustrates a side view of the roof assembly with roof 5 in a first intermediate position Zwst1 towards the closed position Schst. FIG. 4 illustrates a side view of the roof assembly with roof 5 in a second intermediate position Zwst11 towards the opened position Ost. FIG. 5 illustrates a side view of the roof assembly with roof 5 in the opened position Ost.

Roof elements 8, 9, 10, 11 pass through the first intermediate position (FIG. 3) and then through the second intermediate position (FIG. 4) when roof 5 moves from the closed position (FIG. 2) to the opened position (FIG. 5). Conversely, roof elements 8, 9, 10, 11 pass through second intermediate position and then through the first intermediate position when roof 5 moves from the opened position to the closed position.

The roof assembly further includes a main guide bar system 13. Main guide bar system 13 movably attaches frontal roof element 8 and front roof element 9 to vehicle body 2. Roof elements 8, 9, 10, 11 are further linked to one another such that the roof elements are movable via main guide bar system 13 between the closed and opened positions. In particular, roof elements 8, 9, 10, 11 are linked such that the roof elements are arranged to lie above one another in the opened position. In the opened position, the inner sides IsI, IsII, IsIII, and IsIV of roof elements 8, 9, 10, 11 point in the direction C to the roadway (onionskin layering) and rest in storage space 14 in vehicle body 2.

Main guide bar system 13 includes a first main guide bar 15 and a second main guide bar 16. First main guide bar 15 is a front main guide bar and second main guide bar 16 is a rear main guide bar relative to the direction of forward vehicle travel B. Front main guide bar 15 is rotatably connected at one end to vehicle body 2 via a first articulated joint 17 and is rotatably connected at another end to a cantilever beam 19 of front roof element 9 via a second articulated joint 18. Cantilever beam 19 is oriented in the longitudinal vehicle direction A-A. Rear main guide bar 16 is rotatably connected at one end to vehicle body 2 via a third articulated joint 20 and is rotatably connected at another end to cantilever beam 19 via a fourth articulated joint 21. The connections between front main guide bar 15, rear main guide bar 16, cantilever beam 19 of front roof element 9, and vehicle body 2 form a first four-bar linkage VgI. The first four-bark linkage VgI is provided in order to move front roof element 9.

A second four-bar linkage VgII is provided in order to move frontal roof element 8. To this end, front main guide bar 15 includes a first extension 22 which projects over second articulated joint 18 and is rotatably connected to frontal roof element 8 via a fifth articulated joint 23. Cantilever beam 19 includes a second extension 24 that extends between second articulated joint 21 and a sixth articulated joint 25 of frontal roof element 8. A control rod StI acts on frontal roof element 8 by being rotatably connected at one end to sixth articulated joint 25 and rotatably connected at another end to frontal roof element 8 via a seventh articulated joint 25'.

The roof assembly further includes a guide bar mechanism 26. Main guide bar system 13 cooperates with middle roof element 10 via guide bar mechanism 26. Guide bar mechanism 26 operates with first, second, and third control rods 27, 28, and 29 such that middle roof element 10 assumes a stacked position above rear roof element 11 in the opened position, which supports a rear window 31 surrounded by a rear window frame behind rear roof element 11. Rear window frame 30 is movably mounted on vehicle body 2 by a lever assembly 32. Lever assembly 32 includes first and second lever mechanisms 33 and 34.

First control rod 27 is rotatably connected at one end to middle roof element 10 and is rotatably connected at another end to front main guide bar 15. In particular, first control rod 27 is pivotally linked to middle roof element 10 via a first fulcrum pin DzI and is pivotally linked to front main guide bar 15 via a second fulcrum pin DzII on first main guide bar 15. Second control rod 28 is rotatably connected at one end to middle roof element 10 and is rotatably connected at another end to rear main guide bar 16. In particular, second control rod 28 is pivotally linked to middle roof element 10 via a third fulcrum pin DzIII and is pivotally linked to rear main guide bar 16 via a fourth fulcrum pin DzIV. Third control rod 29 is rotatably connected at one end to middle roof element 10 and is rotatably connected at another end to rear main guide bar 16. In particular, third control rod 29 is pivotally linked to middle roof element 10 via a fifth fulcrum pin DzV and is pivotally linked to rear main guide bar 16 via a sixth fulcrum pin DzVI.

A bearing support 35 having approximately the same length as middle roof element 10 is used to support control rods 27, 28, and 29 on middle roof element 10. In order to attach control rods 27, 28, and 29 to main guide bars 15, 16, the main guide bars include bearing fixtures 36, 37, and 38. Bearing fixtures 36, 37, 38 can be fabricated from the same piece as main guide bars 15, 16. In this embodiment, first control rod 27 is formed as a straight element and second and third control rods 28, 29 are formed as knee levers.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A roof assembly for a vehicle, the roof assembly comprising:
    a roof having a front roof element, a middle roof element, and a rear roof element which are movable between a closed position in which the roof elements extend longitudinally side-by-side and an opened position in which the roof elements lie above one another, wherein the roof elements create a shaped section of an exterior shell of a vehicle body when in the closed position;
    a main guide bar system having a front main guide bar and a rear main guide bar, wherein one end of the front main guide bar and one end of the rear main guide bar are connected to the front roof element and the other ends of the front main guide bar and the rear main guide bar are rotatable about respective articulated joints to move the roof elements between the closed and opened positions; and
    a guide bar mechanism having a first control rod rotatably connected between the front main guide bar and the middle roof element and a second control rod rotatably connected between the rear main guide bar and the middle roof element to assure a desired movement of the middle roof element when the roof elements are moved between the closed and opened positions;
    wherein the front roof element includes a cantilever beam, wherein the one end of the rear main guide bar is connected to the cantilever beam to connect to the front roof element.

2. The assembly of claim 1 wherein:
    the control rods enable the middle roof element to assume a stacked position above the rear roof element in the opened position.

3. The assembly of claim 1 wherein:
    the guide bar mechanism further includes a third control rod rotatably connected between the rear main guide bar and the middle roof element.

4. The assembly of claim 1 wherein:
    the control rods are rotatably connected to the middle roof element via a bearing support.

5. The assembly of claim 1 wherein:
    the first control rod is formed as a straight element.

6. The assembly of claim 1 wherein:
    the second control rod is formed as a knee lever.

7. The assembly of claim 1 wherein:
    the first control rod is rotatably connected to the front main guide bar via a first bearing fixture and the second control rod is rotatably connected to the rear main guide bar via a second bearing fixture.

8. The assembly of claim 1 wherein:
    the roof further includes a frontal roof element.

9. A roof assembly for a vehicle, the roof assembly comprising:
    a roof having a front roof element, a middle roof element, and a rear roof element which are movable between a closed position in which the roof elements extend longitudinally side-by-side and an opened position in which the roof elements lie above one another, wherein the roof elements create a shaped section of an exterior shell of a vehicle body when in the closed position;
    a main guide bar system having a front main guide bar and a rear main guide bar, wherein one end of the front main guide bar and one end of the rear main guide bar are connected to the front roof element and the other ends of the front main guide bar and the rear main guide bar are rotatable about respective articulated joints to move the roof elements between the closed and opened positions; and
    a guide bar mechanism having a first control rod rotatably connected between the front main guide bar and the middle roof element and a second control rod rotatably connected between the rear main guide bar and the middle roof element to assure a desired movement of the middle roof element when the roof elements are moved between the closed and opened positions;
    wherein the roof further includes a frontal roof element, wherein the front main guide bar includes a first extension connected to the frontal roof element and the front roof element includes a cantilever beam having a second extension connected to the frontal roof element to move the frontal roof element as the roof elements move between the closed and opened positions.

10. A vehicle comprising:
    a roof having a front roof element, a middle roof element, and a rear roof element which are movable between a closed position in which the roof elements extend longitudinally side-by-side over a passenger cabin of the vehicle body and an opened position in which the roof elements are stacked on one top of another and lie within a storage space in the rear of the vehicle body, wherein the roof elements create a shaped section of an exterior shell of the vehicle when in the closed position;
    a main guide bar system having a front main guide bar and a rear main guide bar, wherein one end of the front main guide bar and one end of the rear main guide bar are connected to the front roof element and the other ends of the front main guide bar and the rear main guide bar are rotatably connected to the vehicle body about respective articulated joints to move the roof elements between the closed and opened positions; and
    a guide bar mechanism having a first control rod rotatably connected between the front main guide bar and the middle roof element and a second control rod rotatably connected between the rear main guide bar and the middle roof element to assure a desired movement of the middle roof element when the roof elements are moved between the closed and opened positions.

11. The vehicle of claim 10 wherein:
    the control rods enable the middle roof element to assume a stacked position above the rear roof element in the opened position.

12. The vehicle of claim 10 wherein:
    the guide bar mechanism further includes a third control rod rotatably connected between the rear main guide bar and the middle roof element.

13. The vehicle of claim 10 wherein:
    the front roof element includes a cantilever beam, wherein the one end of the rear main guide bar is connected to the cantilever beam to connect to the front roof element.

14. The vehicle of claim 10 wherein:
    the control rods are rotatably connected to the middle roof element via a bearing support.

15. The vehicle of claim 10 wherein:

the first control rod is formed as a straight element.

16. The vehicle of claim 10 wherein:

the second control rod is formed as a knee lever.

17. The vehicle of claim 10 wherein:

the first control rod is rotatably connected to the front main guide bar via a first bearing fixture and the second control rod is rotatably connected to the rear main guide bar via a second bearing fixture.

18. The vehicle of claim 10 wherein:

the roof further includes a frontal roof element.

19. The vehicle of claim 18 wherein:

the front main guide bar includes a first extension connected to the frontal roof element and the front roof element includes a cantilever beam having a second extension connected to the frontal roof element to move the frontal roof element as the roof elements move between the closed and opened positions.

\* \* \* \* \*